US006377960B1

(12) United States Patent
Qiu et al.

(10) Patent No.: US 6,377,960 B1
(45) Date of Patent: Apr. 23, 2002

(54) TRANSACTIONAL CONFIGURATION STORE AND RUNTIME VERSUS ADMINISTRATION ISOLATION WITH VERSION SNAPSHOTS AND AGING

(75) Inventors: Wenjun Qiu, Bellevue; Jason L. Zander, Redmond; Markus Horstmann, Redmond; William D. Devlin, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/361,107

(22) Filed: Jul. 26, 1999

(51) Int. Cl.[7] .............................................. G06F 17/30
(52) U.S. Cl. .......................... 707/203; 707/200; 717/11
(58) Field of Search .................................. 707/100, 101, 707/102, 200, 201, 203, 204; 717/11

(56) References Cited

U.S. PATENT DOCUMENTS

| 5,485,617 | A |   | 1/1996 | Stutz et al. |
| 5,517,645 | A |   | 5/1996 | Stutz et al. |
| 5,706,505 | A |   | 1/1998 | Fraley et al. |
| 5,758,154 | A | * | 5/1998 | Qureshi ....................... 395/651 |
| 5,794,038 | A |   | 8/1998 | Stutz et al. |
| 5,911,068 | A |   | 6/1999 | Zimmerman et al. |
| 6,154,878 | A | * | 11/2000 | Saboff .......................... 717/11 |
| 6,185,734 | B1 | * | 2/2001 | Saboff et al. .................. 717/11 |
| 6,263,348 | B1 | * | 7/2001 | Kathrow et al. ............ 707/203 |

OTHER PUBLICATIONS

Chappell, D., "COM+ The Future of Microsoft's Component Object Model", *Distributed Computing Monitor*, vol. 13, No. x, pp. 3–17 (1998).

* cited by examiner

*Primary Examiner*—Hosain T. Alam
*Assistant Examiner*—Joon Hwan Hwang
(74) *Attorney, Agent, or Firm*—Merchant & Gould P.C.

(57) ABSTRACT

An improved registration datastore comprises a datastore containing the database coupled to a data table object structure to present the data to a registration system in the form of an abstract table of data. The use of a data table structure between the registration system and the datastore provides storage location and format independence as the data table object presents the registration data to a calling object in the form of a data level table, a collection of configuration data items. The improved registration system permits one or more objects to be simultaneously installed into the registration database by different sources. The new registration system utilizes a database versioning and aging mechanism to permit multiple calling objects to operate using a version of the database known to be valid when its operations began.

15 Claims, 8 Drawing Sheets

(a)

(b)

TRANSACTIONAL CONFIGURATION STORE AND RUNTIME VERSUS ADMINISTRATION ISOLATION WITH VERSION SNAPSHOTS AND AGING

TECHNICAL FIELD

This invention relates in general to a method and apparatus for providing a software object registration datastore, and more particularly to a method and for providing a transactional configuration datastore having runtime versus administration isolation with version snapshots and aging.

BACKGROUND OF THE INVENTION

In prior software object registration processes, software components were installed into a system by requiring the component developer to modify a system registry to place catalog information within the registry to inform the system of the existence, location, and properties of the component or object. This software architecture requires all developers to both understand and utilize the organization and structure of the registry to install their objects. This requirement is significant in that the actions of one developer may inadvertently, and yet, adversely affect the operation of other objects once the common registry is altered. Additionally, the previously implemented organization and structure of the registry needs to be maintained to ensure the operation of legacy operations within a system.

SUMMARY OF THE INVENTION

These problems are solved in one aspect of the present invention by defining a new registration datastore and corresponding registration system that is constructed to hold the system catalog information previously stored within the registry. The registration data is presented to calling processes utilizing an abstract data structure to permit the datastore to be implementation format and storage location independent to overcome the problems found in prior systems.

Also, the present invention solves the above-described problems by providing an improved registration datastore comprises a datastore containing the database coupled to a data table object to present the data to a registration system in the form of an abstract virtual table of data. The registration system places the new registration data for an object being installed within the system into the database using the data table. This feature provides for isolation between the developer and the datastore.

The use of a data table structure between the registration system and the datastore provides storage location and format independence as the data table presents the registration data to a calling object in the form of a data table, a collection of data items. As such, legacy issues are minimized or eliminated as backward compatibility may be maintained by utilizing a constant organization for the data stored and the data retrieved using the data table. The data table will process the data from its table into a form needed to store it within one or more datastores used to construct the registration database (RegDB).

This invention also relates to a new registration system which permits multiple sources to read from the registration datastore while another is updating the datastore. Write operations from different sources are serialized. Each write operation may include a separate set of changes and the write operation may be transactional. The new registration system utilizes a database versioning and aging mechanism to permit each calling object to operate using a version of the database known to be valid and latest when its operations began. When an object is modifying the database, the entire database is copied to a temporary file and then modified. The modified file is renamed to a new version of the database. Each version of the database possesses a unique name that includes a version number. Objects reading from a particular version of the database may continue to operate using the same version of the database after a new version is created by the registration process. Once all objects have released a particular version of the database and when their processing is complete, the old versions of the database are deleted by a background thread executing as part of the system process.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION

An embodiment of the present invention utilizes table objects for providing one or more new object registration datastores in a computer system. The new registration datastore and corresponding registration system is constructed to hold system catalog information previously stored within the registry. The registration data is presented to calling processes utilizing an abstract data structure. In the preferred embodiment, the registration datastore is accessed using a data table object.

Figure 1:
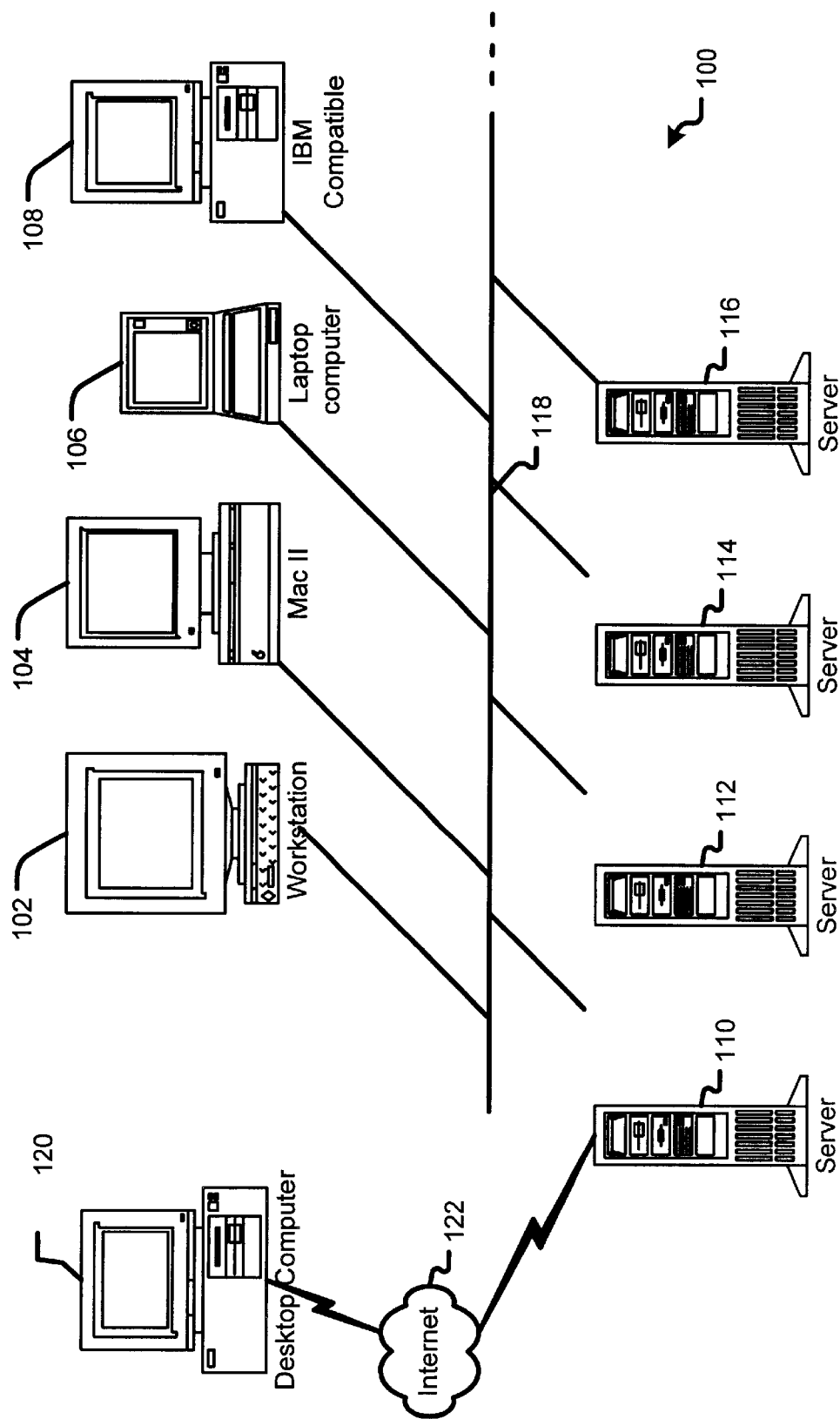
FIG. 1 illustrates a block diagram for a client server architecture used in conjunction with an example embodiment of the present invention.

FIG. 1 is a pictorial representation of a suitable client-server computing environment in which an embodiment of the present invention may be implemented in both clients and servers. In a computing network 100, client computer systems 102, 104, 106 and 108 are connected to server computer systems 110, 112, 114 and 116 by a network connection 118. Additionally, client computer 120 is connected to server computer 110 via a communication link, such as the Internet 122 or a local area network. Since the server 110 is connected via the network connection 118 to the other servers 112, 114 and 116, the client computer 120 is also connected and may access information on the other servers 112, 114 and 116, and clients 102, 104, 106, and 108, as well as other computer systems coupled to the network 100.

The client computer systems 102, 104, 106, 108 and 120 operate using at least some of the information and processes available on at least one of the servers 110, 112, 114 and 116 as well as other computer systems coupled to the network 100. Each client is preferably a complete, stand-alone computer and offers the user a full range of power and features for running applications. The clients 102, 104, 106 and 108, however, may be quite different from the other clients as long as they can communicate via the common interface 118.

The servers 110, 112, 114 and 116 are preferably computers, minicomputers, or mainframes that provide traditional strengths offered by minicomputers and mainframes in a time-sharing environment (e.g., data management, information sharing between clients, and sophisticated network administration and security features). The client and server machines work together to accomplish the processing of the executed application. Working together in this manner increases the processing power and efficiency relating to each independent computer system shown in FIG. 1.

Typically, a client portion or process of an application executed in the distributed network 100 is optimized for user interaction whereas a server portion or process provides the centralized, multi-user functionality. However, each client computer 102, 104, 106, 108 and 120 can perform functions for other computers, including the clients and servers, thus acting as a "server" for those other computer systems. Similarly, each of the servers 110, 112, 114 and 116 can perform functions and relay information to the other servers, such that each server may act as a "client" requesting information or services from another computer in particular circumstances. Therefore, the term "client," as used hereinafter refers to any computer system making a call or request of another computer system and the term "server" is the computer system servicing the request.

As part of the sophisticated network administration, each computer is able to access configuration information related to applications and resources available on the other computers in the network 100. The configuration information is located within memory or persistent storage on each computer system, i.e., in a datastore. Additionally, each computer system may have more than one datastore of configuration information that must be accessed by the other computer systems. Moreover, the different datastores may each have different data types or formats. In order to access configuration information from these many and various computer datastores, a client, i.e., the system or process making the request for information, communicates with a "catalog" interface on the computer system.

Figure 2:
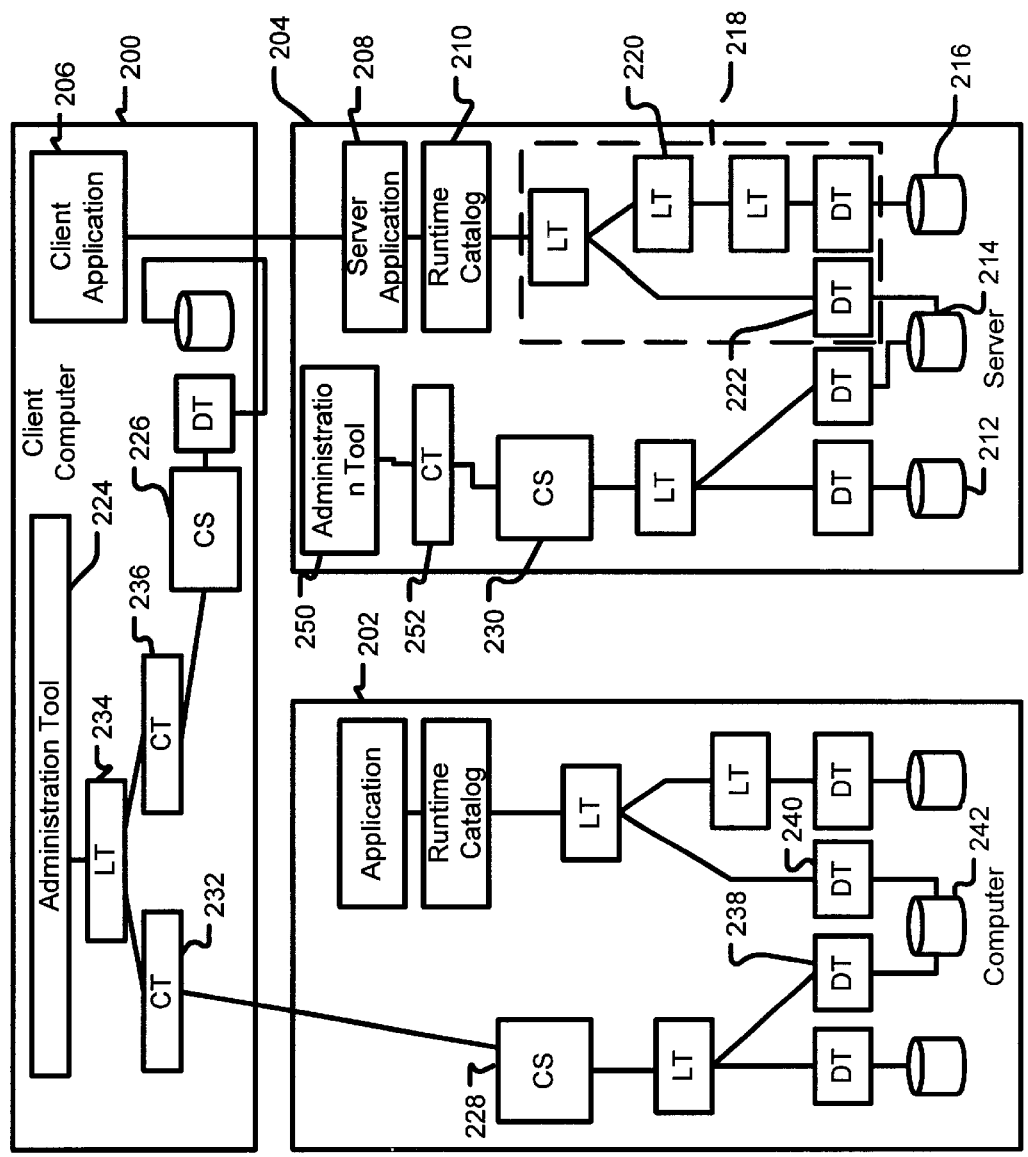
FIG. 2 illustrates a block diagram of an exemplary client server architecture employing a COM+ catalog in accordance with the present invention.

FIG. 2 depicts an exemplary client/server architecture employing COM+ catalogs in accordance with the present invention (COM is an acronym for Component Object Model). A COM+ Catalog is a virtualized database of COM+ applications and their services, with runtime and configuration-time abstraction layers for using and manipulating configuration information. An embodiment of the present invention, for example, may be employed in a component-based programming model of a transaction processing runtime environment for developing, deploying, and managing high-performance, scaleable, and robust enterprise Internet and intranet server applications.

A "component" is software containing classes that may be created and exposed as "objects" (i.e., self-contained programmed entities that consist of both data and functions to manipulate the data) for use by another application. A component can also use objects exposed by another application. For example, a developer can create an application using ActiveX components that can be updated and managed easily as in-process DLLs (Dynamic Link Libraries). The DLLs are then installed into the COM environment for execution within the application. Components can be developed specifically for a developer's single application, developed for use with multiple applications, or purchased from a third party.

COM technology allows a piece of software to offer services to another piece of software by making those services available as "COM objects". COM is a foundation for an object-based system that focuses on reuse of interfaces. It is also an interface specification from which any number of interfaces can be built. Each COM object is an instance of a particular class and supports a number of interfaces, generally two or more. Each interface includes one or more methods, which are functions that can be called by the objects' clients. COM+ technology is an extension of COM technology that includes a new runtime library that provides a wide range of new services, such as dynamic load balancing, queued components, an in-memory database, and events. COM+ technology maintains the basics of COM technology, and existing COM-based applications can continue to work unchanged in a COM+ environment.

An object implemented to comply with COM+ is referred to as a "COM+ object". A component that includes one or more classes that may be instantiated as a COM+ object is referred to as a "COM+ component". Each COM+ component has attributes, which can be set in a component (or type) library. Attributes are a form of configuration data required by many software components to execute correctly and completely. An application that includes COM+ components is referred to as a "COM+ application". When a component is made part of a COM+ application, its component (or type) library is written into a COM+ catalog. When an object is instantiated from that component, the attributes in the COM+ catalog are examined to determine the object context that contains properties for the object. Based on the object context, other services required by the object are provided. In this manner, a developer can merely identify in the attributes the additional functionality required by the object, and based on the object's attributes, the appropriate other services that are available within the system, or the accessible network, are executed to provide that functionality.

In FIG. 2, a client computer 200 is coupled via a network to one or more remote computers (e.g., a computer 202 and a server 204). Although the embodiments of the present invention are illustrated and described herein relative to multiple computer systems coupled by a computer network or other communications connection, it is to be understood that an embodiment of the present invention may be employed in a stand-alone computer system to provide access to configuration information in the system.

A client application 206 executes on the client computer 200 to access a server application 208 executing on the server 204. For example, the server application 208 may include a database application that receives a query from the client application 206 and accesses a customer database (not shown) for all customer data satisfying the query. During operation, the server application 208 may require configuration data recorded in a datastore (such as datastores 214 or 216). For example, a transaction server application can determine the security level of a user according to a "role" assigned to the user by an administrator or other means. Accordingly, the transaction server application might query a role definitions database to validate the user's access to a transaction database (not shown). In another example, the server application 208 accesses configuration information to verify that required services are available for its execution.

To obtain configuration information in the illustrated embodiment, the server application 208 accesses a runtime catalog 210 running on the server 204. The runtime catalog 210 causes one or more table object dispensers to create catalog table objects (shown generally as table system 218) providing the required configuration data in a table to the server application 208. A "table object" includes an object that provides a caller with access to underlying data, presenting that data in virtual "table" format through a defined table interface. A table object may also provide its own functionality, read and write caching and the triggering of external events, in addition to other features. The table data is accessed by a caller (e.g., a catalog server, a runtime catalog, or an overlaying logic table object) by way of a table-oriented interface, preferably including table cursor methods. In the exemplary embodiment, the runtime catalog 210 accesses configuration data in the datastores 214 and 216 through layers of abstraction provided by the table system 218 (i.e., including logic table objects (LT), such as logic table object 220, and data table objects (DTs), such as data table object 222).

A globally unique database ID (identifier) called a "DID" identifies each catalog database. A given DID guarantees a minimum well-defined set of catalog tables, each table being identified by and complying to the rules of a table ID (TID). A DID is a data store independent identity, meaning that the tables of that database can be distributed among multiple datastores. Examples of datastores include the registry, type libraries, SQL (structured query language) Servers, and the NT Directory Service (NT DS), whereas examples of databases include: server group databases, download databases, and deployment databases.

A data table object, such as data table object 222, is a datastore-dependent table object that exposes a table cursor into a particular datastore. The table cursor provides a well-defined table-oriented interface into the datastore while hiding the location and format of the underlying datastore itself. For example, a caller can use a table cursor to navigate through the rows of a column in a table presented to the caller by a table object.

Each data table object is bound to a particular datastore accessible within the computer. For example, a data table object may be bound to the registry to provide the registry data in table form to a higher level (e.g., an overlaid logic table object, catalog server object, or runtime catalog). Another data table object may be bound to the NT Directory Services to provide directory configuration data to a higher level. As shown by data table objects 238 and 240, multiple data table objects may be created for a single datastore (e.g., data table objects 238 and 240 are created by different logic tables objects to provide access to the same datastore 242).

The data table object 222 populates one or more internal caches with read or write data associated with the datastore 214. Queries to the datastore 214 are serviced by the cache or caches through the data table object's table interface. Using at least one "update" method, data in the read cache of data table object 222 may be refreshed from the datastore 214 and data in a write cache may be flushed to the datastore 214. Data table objects are described in more detail in U.S. patent application Ser. No. 09/360,442, entitled "DATA TABLE OBJECT INTERFACE FOR DATASTORE," assigned to the assignee of the present application, filed concurrently herewith and incorporated herein by reference for all that it discloses and teaches.

A logic table object, such as logic table object 220, presents domain-specific table data by logically merging or consolidating table data from multiple data table and/or logic table objects, supplementing table functionality, and/or synthesizing data into the table. Logic table objects in a COM+ Catalog environment are type-independent abstraction layers between a caller (such as the runtime catalog 210) and one or more datastores (such as datastores 214 and 216) containing configuration information. A logic table object typically sits atop one or more data table objects and introduces domain-specific rules and processes to the underlying data table objects, although other configurations of table systems are possible.

More specifically, a logic table object can logically merge or consolidate configuration data from multiple data table and/or logic table objects into a single table based on predetermined logic (e.g., according to type). Furthermore, a logic table object can supplement data table object functionality by intercepting interface calls from a client and adding to or overriding the underlying table object functionality (e.g., adding validation or security). Additionally, a logic table object can synthesize data that is not available from the underlying datastores or tables and present the synthesized data as part of the table. Logic table objects are described in more detail in U.S. patent application Ser. No. 09/360,440, entitled "A LOGIC TABLE ABSTRACTION LAYER FOR ACCESSING CONFIGURATION INFORMATION," assigned to the assignee of the present application, filed concurrently herewith and incorporated herein by reference for all that it discloses and teaches.

The foregoing discussion has described the COM+ Catalog environment as used at runtime by an application. An alternate use of a COM+ Catalog occurs at configuration-time and may employ one or more catalog server objects (CS) and one or more client tables. During configuration, an administration tool, such as Microsoft's Component Services administration tool or COMAdmin Library, is used to create and configure COM+ applications, install and export existing COM+ applications, manage installed COM+ applications, and manage and configure services locally or remotely. Accordingly, in addition to the illustrated embodiments, an embodiment of the present invention may be employed by a local administration tool managing an application running on a remote computer system.

The exemplary administration tool 224 executes on the client computer 200 in FIG. 2. An alternative administration tool (such as administration tool 250) can execute on another computer (such as server 204) to configure applications and services executing in the computer. A catalog server object, such as catalog server objects 226, 228, and 230, manages configuration information on its computer. All administration requests to a computer, whether local or from another computer, go to a catalog server object on that computer, preferably through one or more abstraction layers, including client table objects and logic table objects.

A client table object (CT) is analogous to a data table object that binds to a particular local or remote catalog server object instead of a datastore, presenting the configuration information marshaled by a catalog server object in table form to the caller, such as the administration tool 224. In an alternate embodiment, the logical merging functionality of the logic table object 234 and the communications with multiple catalog server objects provided by client table objects 232 and 236 may be combined into a single client table object that binds to multiple catalog servers. The local catalog server object 226 manages configuration data locally on the client computer 200, while the remote catalog server object 228 service catalog requests from the client table object 232 for configuration information on its remote computer. "Remote" does not necessarily imply that a remote computer geographically distant from a local computer. Instead, remote merely indicates a cross-computer boundary, which may be bridged by a data bus, a network connection, or other connection means.

To access available catalog data in the illustrated exemplary embodiment, the administration tool 224 optionally causes a logic table object 234 to be created, which in turn causes client table objects 232 and 236 to be created for accessing available catalog server objects 226, and 228. The local catalog server object 226 and the remote catalog server object 228 marshal the configuration information stored within their corresponding computers by causing creation of underlying table systems and transferring the data back to the client table objects 232 and 236 for presentation as table data to the logic table object 234, which logically merges the configuration information and presents the configuration information to the administration tool 224 in table format. In the illustrated embodiment, multiple domain-specific logic table objects (such as logic table object 234) can reside between the client table objects 232 and 236, and the administration tool 224. Alternatively, the administration tool 224 may cause only a single client table object (with or without overlaying logic table objects) to be created to access a single catalog server object on a local or remote computer.

Figure 3A:
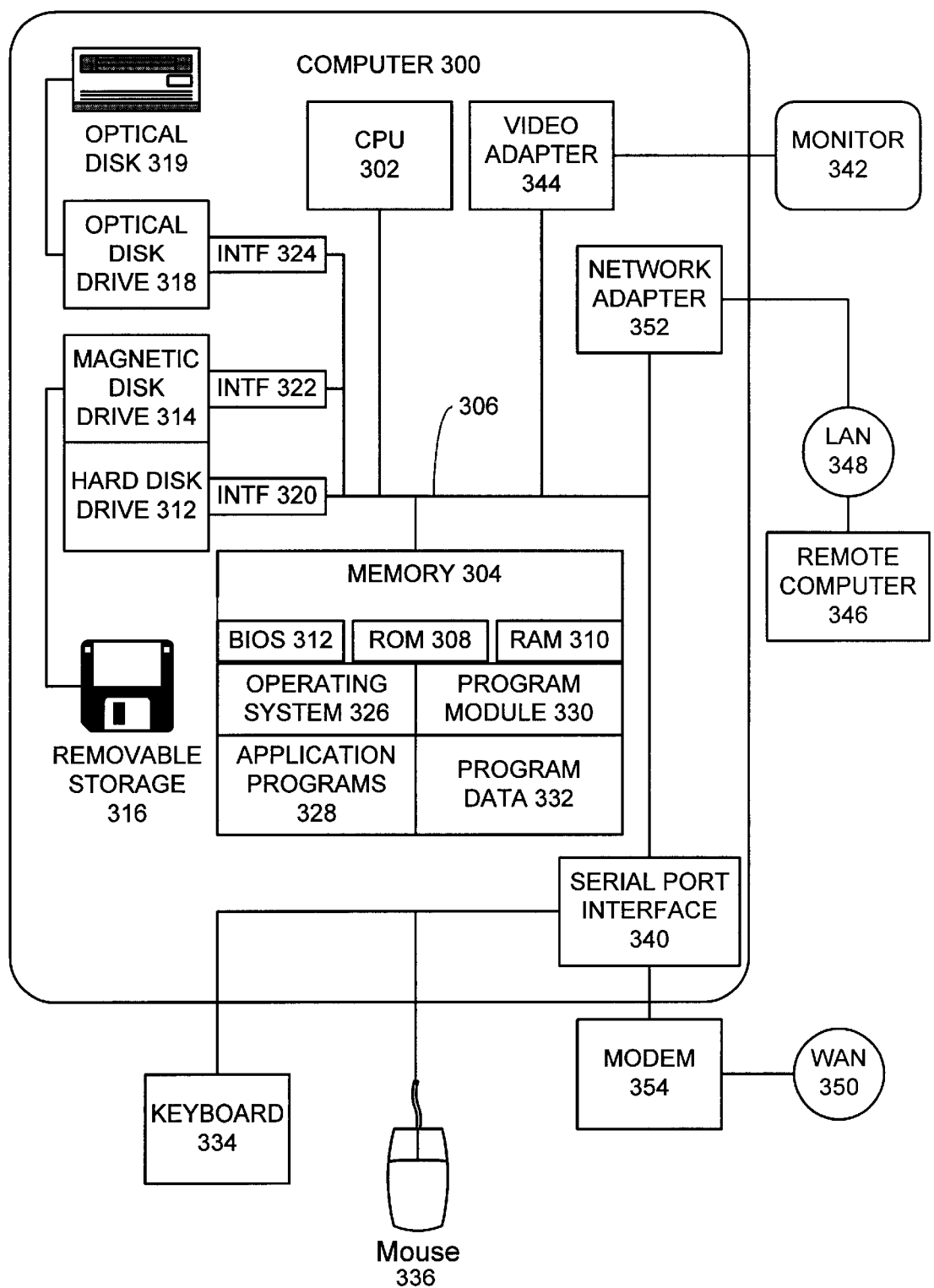
FIGS. 3a and 3b illustrates an exemplary computing system for implementing the present invention comprising a general purpose computing device in the form of a conventional personal computer.

With reference to FIG. 3a, an exemplary computing system for embodiments of the invention includes a general purpose computing device in the form of a conventional computer system 300, including a processor unit 302, a system memory 304, and a system bus 306 that couples various system components including the system memory 304 to the processor unit 300. The system bus 306 may be any of several types of bus structures including a memory bus or memory controller, a peripheral bus and a local bus using any of a variety of bus architectures. The system memory includes read only memory (ROM) 308 and random access memory (RAM) 310. A basic input/output system 312 (BIOS), which contains basic routines that help transfer information between elements within the computer system 300, is stored in ROM 308.

The computer system 300 further includes a hard disk drive 312 for reading from and writing to a hard disk, a magnetic disk drive 314 for reading from or writing to a removable magnetic disk 316, and an optical disk drive 318 for reading from or writing to a removable optical disk 319 such as a CD ROM, DVD, or other optical media. The hard disk drive 312, magnetic disk drive 314, and optical disk drive 318 are connected to the system bus 306 by a hard disk drive interface 320, a magnetic disk drive interface 322, and an optical drive interface 324, respectively. The drives and their associated computer-readable media provide nonvolatile storage of computer readable instructions, data structures, programs, and other data for the computer system 300.

Although the exemplary environment described herein employs a hard disk, a removable magnetic disk 316, and a removable optical disk 319, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 319, ROM 308 or RAM 310, including an operating system 326, one or more application programs 328, other program modules 330, and program data 332. A user may enter commands and information into the computer system 300 through input devices such as a keyboard 334 and mouse 336 or other pointing device. Examples of other input devices may include a microphone, joystick, game pad, satellite dish, and scanner. These and other input devices are often connected to the processing unit 302 through a serial port interface 340 that is coupled to the system bus 306. Nevertheless, these input devices also may be connected by other interfaces, such as a parallel port, game port, or a universal serial bus (USB). A monitor 342 or other type of display device is also connected to the system bus 306 via an interface, such as a video adapter 344. In addition to the monitor 342, computer systems typically include other peripheral output devices (not shown), such as speakers and printers.

The computer system 300 may operate in a networked environment using logical connections to one or more remote computers, such as a remote computer 346. The remote computer 346 may be a computer system, a server, a router, a network PC, a peer device or other common network node, and typically includes many or all of the elements described above relative to the computer system 300. The network connections include a local area network (LAN) 348 and a wide area network (WAN) 350. Such networking environments are commonplace in offices, enterprise-wide computer networks, intranets, and the Internet.

When used in a LAN networking environment, the computer system 300 is connected to the local network 348 through a network interface or adapter 352. When used in a WAN networking environment, the computer system 300 typically includes a modem 354 or other means for establishing communications over the wide area network 350, such as the Internet. The modem 354, which may be internal or external, is connected to the system bus 306 via the serial port interface 340. In a networked environment, program modules depicted relative to the computer system 300, or portions thereof, may be stored in the remote memory storage device. It will be appreciated that the network connections shown are exemplary, and other means of establishing a communication link between the computers may be used.

In an embodiment of the present invention, the computer system 300 stores the configuration data and implementation code providing the catalog infrastructure and disclosed and claimed herein in accordance with the present invention. The catalog infrastructure has without limitation one or more datastores, catalog servers, runtime catalogs, server applications, administration tools, dispensers, and wiring databases. Specifically, one or more dispensers, preferably including a table dispenser and a table object dispenser, provide a table object to a caller providing location and type independent access to configuration information stored in one or more datastores.

Figure 3B:
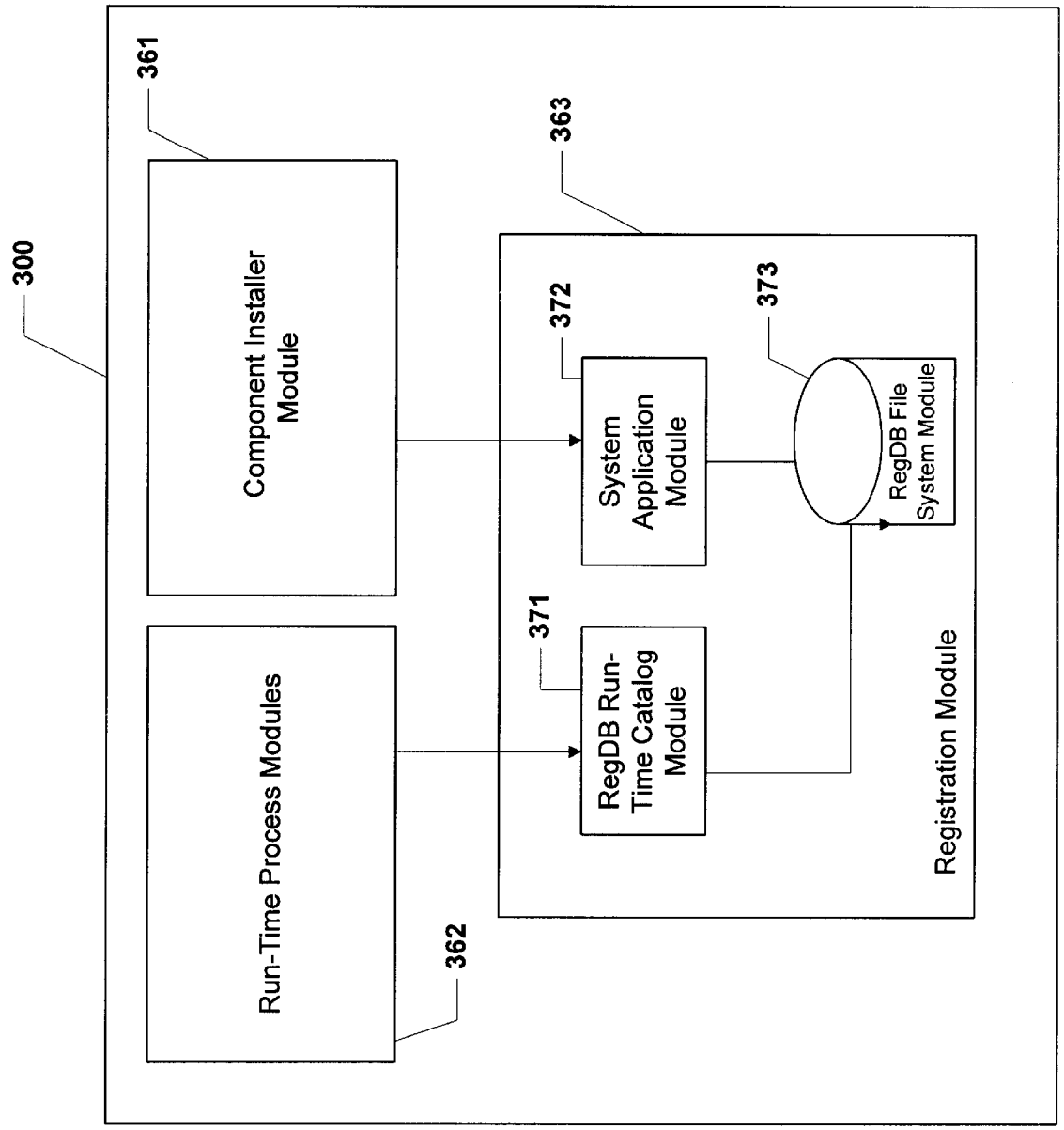

FIG. 3b illustrates a logical block diagram for the functional modules present in an exemplary computing system according to one preferred embodiment of the present invention. The computing system 300 comprises one or more run-time process modules 362, one or more component installer modules 361, and a RegDB registration module 363. Runtime modules 362 comprise application programs and other executable processes that execute a set of computing instructions on the computing system 300 to perform any number of processing tasks. Typically, these application programs are the programs controlled by a user of the computing system 300 to perform a set of desired operations.

Component installer modules 361 comprise the set of software processes that install one or more software components onto computing system 300. Typically, these component installer modules 361 are responsible for installing large application programs that are developed by various software developers. However, these modules 361 may comprise any computational process executing upon computing system 300 that creates and installs components within the registration module 363 for use by other runtime modules 362 in the performance of their respective functions.

The RegDB registration module 363 maintains the system component registration database, RegDB datastore, for use by the runtime process modules 362 and the component installer modules 361. The runtime process modules 362 interact with a RegDB runtime catalog module 371 to obtain runtime catalog information from the RegDB datastore 373 when the runtime modules 362 are interacting with other components within computing system 300. The component installer modules 361 interact with the system application 372 when components, and their corresponding registration data are being installed within computing system 300. The operation of the RegDB registration module 363 is discussed in more detail with reference to FIG. 4 below.

Figure 4:
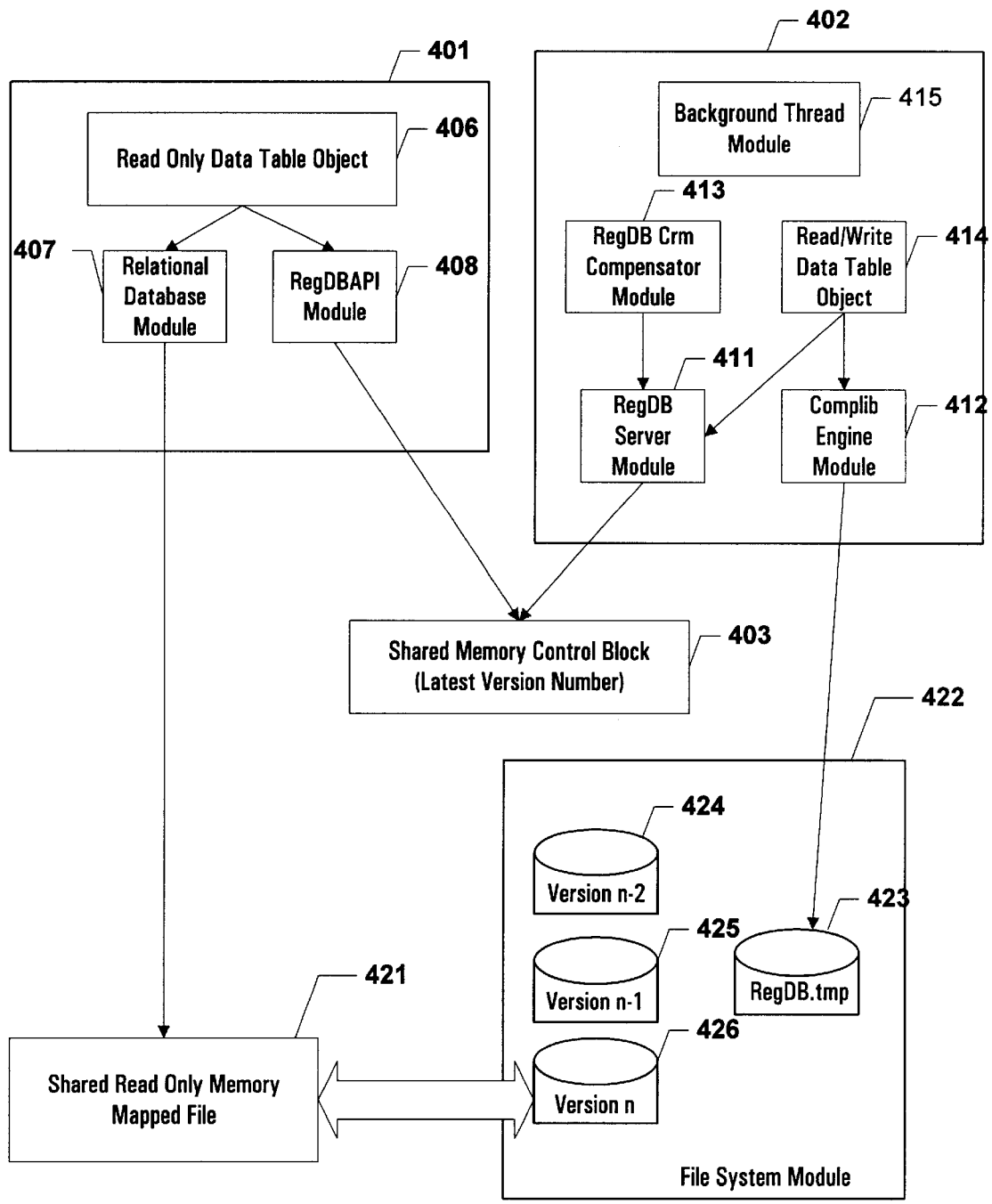
FIG. 4 illustrates a logical block diagram of a RegDB configuration datastore according to an example embodiment of the present invention.

FIG. 4 illustrates a RegDB registration module and corresponding datastore according to an example embodiment of the present invention. The RegDB datastore is used by the software configuration system to maintain registry information regarding software components installed within a computing system. The entire registry database is stored within the RegDB file and presented to a calling object using a data table data structure.

The RegDB system comprises a runtime module 401, a system application 402, a shared memory control block 403, one or more shared read-only memory mapped file 421, and a file system module 422. The runtime process 401 is utilized to permit the computing system to activate software modules installed within the system. The system application 402 is utilized to register software objects within the RegDB datastore 426. The shared memory control block 403 is utilized to maintain a set of system parameters used in operation of the runtime process 401 and system application process 402. The latest version number for the RegDB datastore is among the parameters stored within the shared memory control block 403. The shared read-only memory mapped file 421 has a shared read-only memory used by the runtime processes 401 to read the registration data corresponding to the latest version of the RegDB datastore 426. The file system module 422 comprises a mass storage system utilized to maintain the various dated versions of the RegDB datastore 426–428.

RegDB files 424–426 are COMPLIB database files with 12-digit hex version number embedded in the file names. For example, R000000001461.clb has version number 1461 in hex, or 5217 in decimal. Since version number is only incremented by 1 for each transaction, 12-digit hex number ensures it's virtually impossible for the number to reach the upper limit 0xffffffffffff, so REGDB does not handle the version number wrap around.

Each version of the RegDB file 424–426 is a snapshot of the entire RegDB database. Runtime processes 401 look into the latest snapshot of the REGDB 426 every time a new COM component is activated, no matter it's COM classic component, or COM+ services component. RegDB should attempt to ensure that the datastore lookup will not have any noticeable performance impact on COM classic component activation.

The runtime module 401 has a read-only data table object 406 that obtains the data for populating the data table from the REGDBAPI 408 and a relational database engine module 407. In a preferred embodiment, the relational database engine 407 is a relational database engine used to read and update complib files within a COM component system. In alternate embodiments, this engine may comprise any relational database engine that interacts with a registration database without deviating from the spirit and scope of the present invention as recited within the attached claims. REGDBAPI 408 is a library that implements a set of APIs to help runtime processes to detect and open the latest version of the RegDB files in the most efficient way. The relational database engine module 407 is utilized to obtain the necessary registration data from the shared read-only memory mapped file 421 that possesses the registration database corresponding to the latest version of the RegDB datastore 426.

The system application process 402 has a background thread module 415, a RegDB CRM Compensator module 413, a read/write data table object 414, a RegDB server module 411, and a Complib engine module 412. The background thread module 415 is a thread in the system application process executing concurrent with other processes on a computing system to delete old versions of the RegDB datastore files 424–425 once all processes on the computing system are finished utilizing this version. Since new versions of the datastore are created each time objects are registered with the datastore, and since only the latest version of the datastore are utilized by runtime processes 401, the prior versions of the datastore may be deleted to conserve storage within the file system 422 once all processes using a particular version of the datastore are finished with that particular version.

REGDBSERVER module 411 is the server side library that ties with the Catalog Server component. As mentioned earlier, all of the administrative requests including REGDB updates have to go through the Catalog Server that's running in the System Application. The APIs implemented in the REGDBSERVER module 411 do the actual work of transaction RegDB updates, as illustrated below in FIG. 6. The read/write data table object 414 is the data structure utilized to hold the changes being made to the RegDB datastore during the execution of the software component installation and registration process. Once all of the changes are made within the data table object, the changes are made to the RegDB datastore within the file system 422 as part of a transaction process. The Complib engine module 412 is utilized to update the RegDB files with the data from the data table objects 414. The RegDB Compensator module 413 controls the two-phase data commit process used to update the RegDB datastore using transactional processing as discussed below in reference to FIG. 7.

Figure 5:
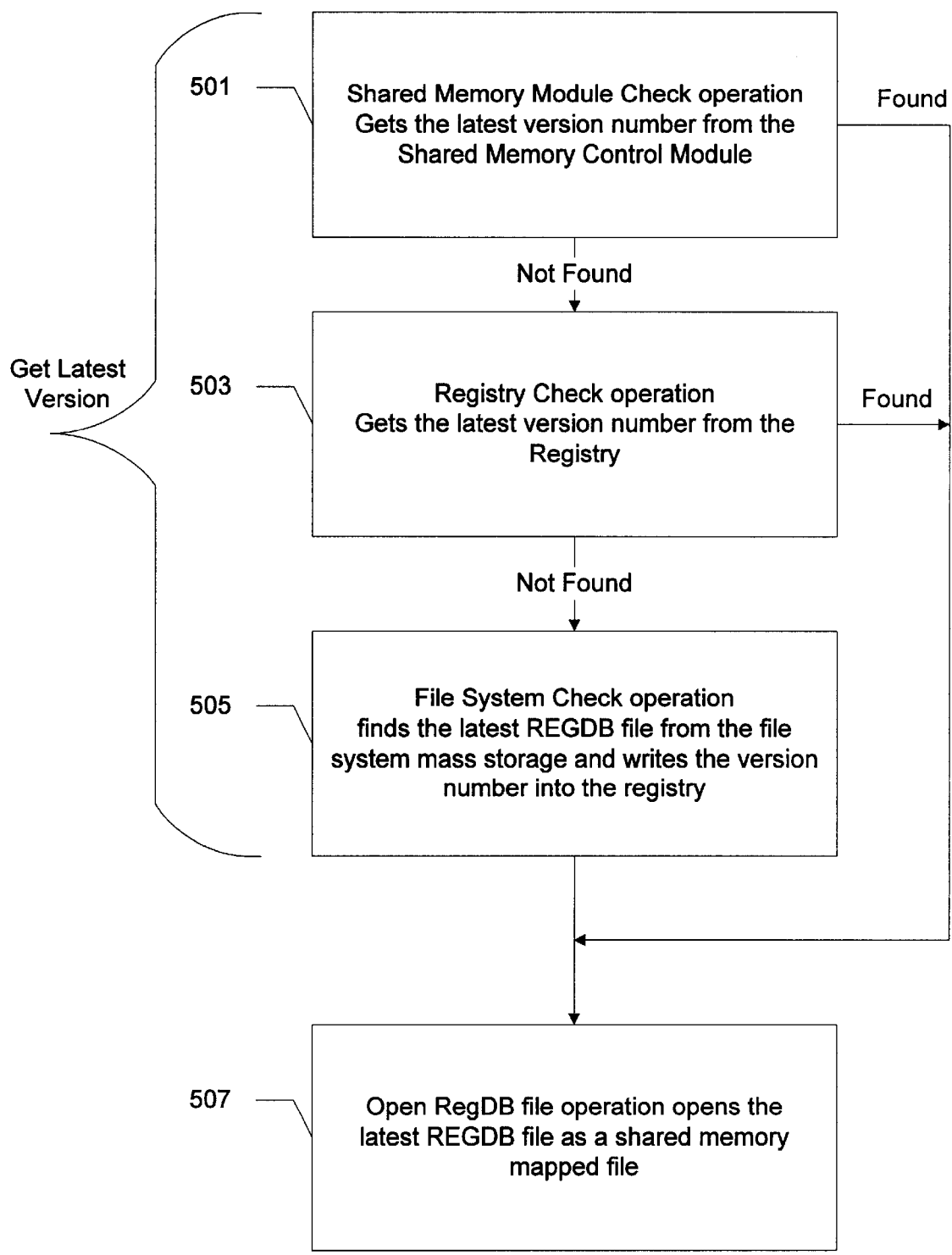
FIG. 5 illustrates a logical operation flow diagram for the operations performed associated with a REGDBAPI process according to one example embodiment of the present invention.

FIG. 5 illustrates a logical operation flow diagram for the operations performed associated with a REGDBAPI 408 module according to one example embodiment of the present invention. The sequence of operations performs a 3-level of version lookup from the fastest to the slowest. A shared memory module check operation 501 attempts to obtain the latest version number from the shared memory control block 403. If this operation 501 is not successful, a registry check operation 503 attempts to obtain the latest version number from the system registry. If this second operation 503 is not successful, a file system check operation 505 finds the latest RegDB file 426 from the file system module 422. The latest version number is extracted from the file name for the RegDB file 426 found. The operation 505 writes the obtained version number into the system registry.

The most straightforward way for latest version lookup is to enumerate through every RegDB file 424–426, extract the version number from the file name and do a comparison. However, if every runtime process has to perform this step whenever it creates a COM component, processing efficiency would suffer. To address this issue, RegDB system provides caching to improve the performance. When the System Application 402 starts to run, it creates a shared memory control block 403, finds the latest RegDB version and writes the number into the control block 403. Since all RegDB updates have to go through the System Application 402, it is responsible for updating the version number in the control block 403 immediately after a new RegDB file has been created. Therefore, as long as the System Application 402 is running, runtime processes 401 check the latest version directly from the control block 403. While the System Application 402 is not running, the first runtime process 401 will find the latest version from the disk and put it into a Registry key. All the subsequent processes or operations only need to get that value from the Registry. Later, when the System Application 402 starts up again, the cached Registry value will be deleted.

After version lookup has finished, REGDBAPI opens that latest RegDB file through COMPLIB engine. To minimize the system memory usage, RegDB file will always be opened as read only memory-mapped file shared between runtime processes. The naming scheme for the file mapping objects is similar to that for the files. It's a fixed format with version number embedded. The mapping for R000000001461.clb will be named as _R_000000001461_SMEM_, for instance. The mapping name is passed to the COMPLIB API along with create and open flag. The engine will try to open this file-mapping object and map into its process, or create a file mapping with this name if it doesn't exist yet.

COMPLIB API could fail to create to open the file mapping for various reasons. For the errors we expect and know how to recover from, REGDBAPI 408 has the retry logic to go through the flow chart in FIG. 5 once again before it returns an error. One example is latest RegDB file becomes corrupted and COMPLIB engine 412 fails to open the file. REGDBAPI 408 will delete the corrupted file, find the previous version, which now becomes latest, and call COMPLIB API to open it.

Figure 6:
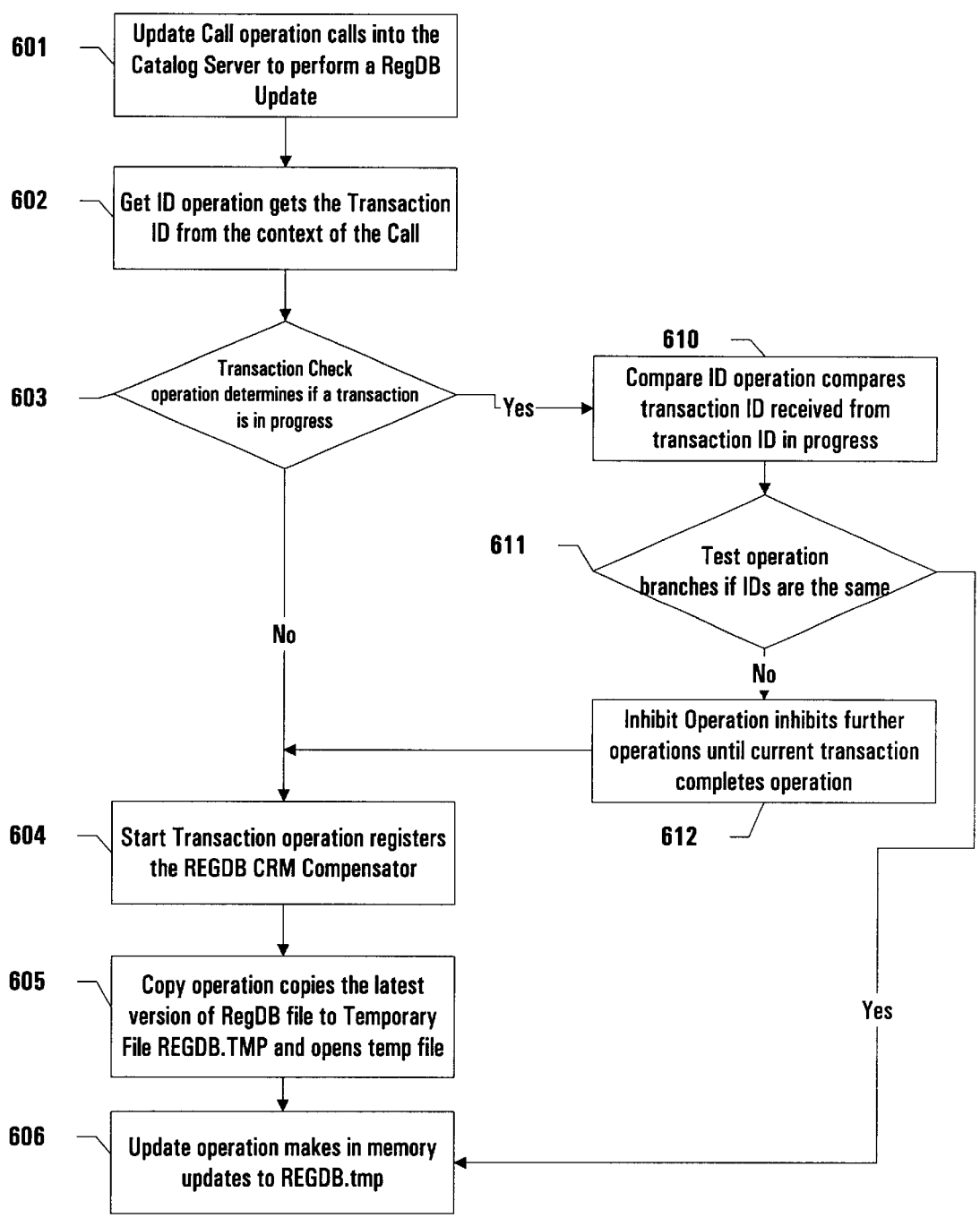
FIG. 6 illustrates a logical operation flow diagram for the operations performed associated with a REGDBSERVER transaction in progress process according to one example embodiment of the present invention.

FIG. 6 illustrates a logical operation flow diagram for the operations performed, when there is a transaction in progress process implemented in the REGDB SERVER 411 module, according to one example embodiment of the present invention. When an admin client process calls into Catalog Server, it may already have a transaction in progress. In this case, transaction context flows from the client process to the Catalog Server. On the other hand, if it does not have a transact ion yet, Catalog Server will start a new transaction. All this happens automatically since Catalog Server is a COM+ component configured as "Require a Transaction." REGDB transactions are serialized by NT event object.

When an incoming thread calls an update method on the Catalog Server 601, either there's no transaction being processed, or there is one. The transaction ID will always be retrieved from the context of the incoming thread by the Get ID operation 602. Transaction check operation 603 determines if a transaction is in progress. If no transaction is present, the thread can proceed to do the work in Start transaction 604. Its transaction ID will be saved in a global variable. Because it's a new transaction, REGDBSERVER creates a CRM Clerk object, which is a part of the CRM framework, and register our REGDB CRM Compensator to enlist the transaction. Then the latest REGDB file is copied to a temporary file with a hard coded name, say REGDB.tmp in Copy operation 605. REGDB.tmp is opened by COMPLIB engine as in memory data structures, so the update operation 606 can perform the updates in memory through the COMPLIB interface.

If a transaction is present, the transaction check operation branches to the compare ID operation 610. In the compare ID operation 610, transaction ID of the incoming thread is compared with the saved ID of the transaction currently in progress. If they found to be different in test operation 611, the thread will be blocked until the current transaction commits or aborts in inhibit operation 612. If they are the same, then the present transaction is a transaction composed by the client process and it has called into Catalog Server before. Now it calls again to do more RegDB updates within the same transaction scope 604–606. Obviously, the processing should not be blocked. Moreover, RegDB CRM Compensator is already registered for this transaction and REGDB.tmp 423 has been opened. All that needs to occur is to make additional changes to the RegDB.tmp file 423 through the COMPLIB interface.

Figure 7A:
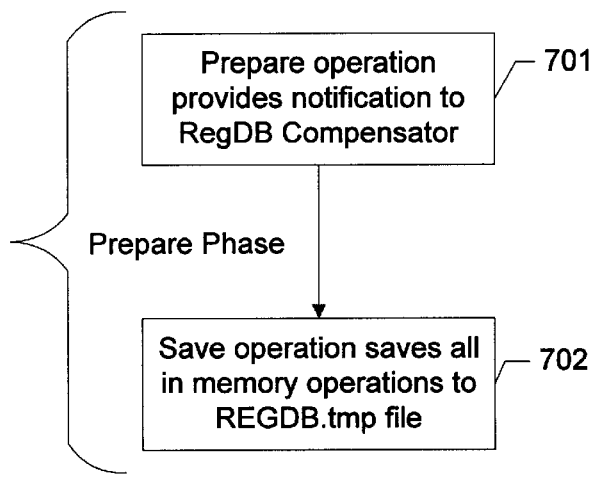
FIGS. 7a and 7b illustrates a logical operation flow diagram for the operations performed associated with a REGDBSERVER transaction commit process according to one example embodiment of the present invention.
Figure 7B:
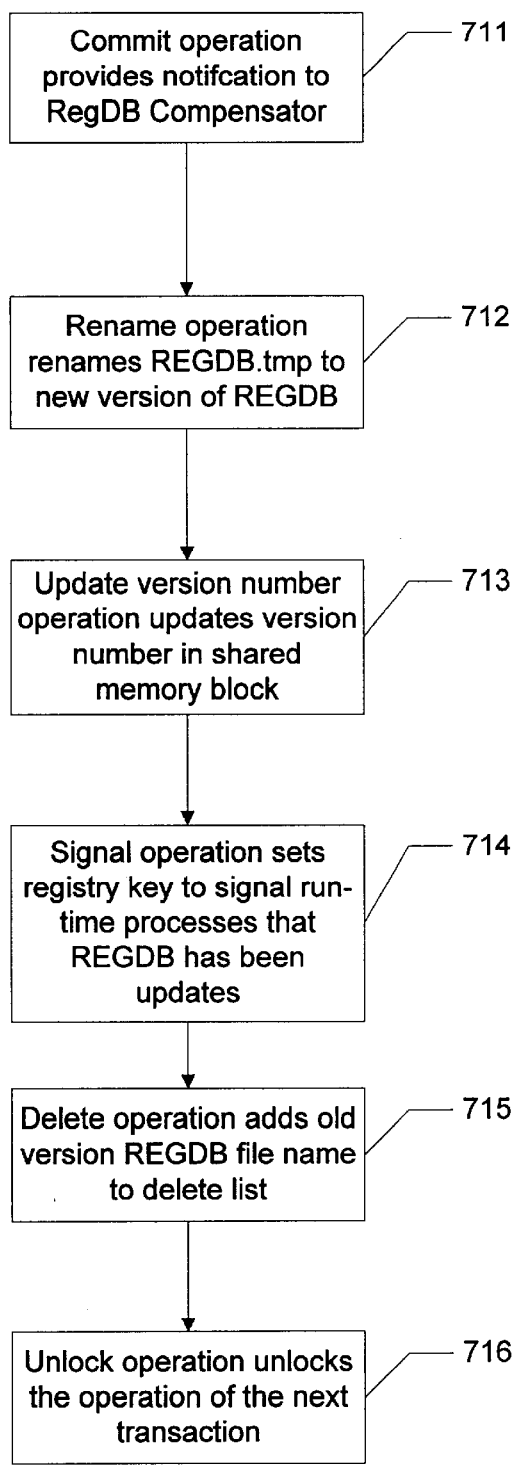

FIG. 7 illustrates a logical operation flow diagram for the operations performed, when there is a transaction commit process implemented in the REGBDSERVER 411 module, according to one example embodiment of the present invention. If the RegDB transaction is composed by admin client process, the client process controls when to commit or abort the transaction. Otherwise, Catalog Server is the root of the transaction. It is configured such that the transaction will commit or abort the moment the call returns from the Catalog Server. FIG. 7 shows the sequence of operations that occur at commit time. In the COM+ world, Distributed Transaction Coordinator (DTC) is the transaction manager. It uses two-phase commit protocol as shown in FIGS. 7a and 7b respectively.

After a set of consistent RegDB updates within a transaction scope has finished successfully, the root component of the transaction decides whether the entire transaction should commit. DTC will then send the PREPARE notification to the REGDB CRM Compensator 413 in prepare operation 701. The Compensator 413 in turn calls an API on REGDB-SERVER 411 library. The API then calls Save ( ) method on the COMPLIB interface to save all the in memory modifications to REGDB.tmp 423 on disk in save operation 702. If Save ( ) succeeds, the API returns SUCCEED code to the compensator 413, which returns it to DTC. DTC then determines it's OK to proceed to the second phase, that is COMMIT.

When the Compensator 413 receives COMMIT notification in commit operation 711, it again calls into REGDB- SERVER 411. In rename operation 712, REGDBSEVER next performs is to rename REGDB.tmp 423 to the new version of RegDB, i.e. a file with a Rxxxxxxxxxxxxx.clb name, where xxxxxxxxxxxxxx equals the former latest version number plus one Immediately thereafter in update version number operation 713, the shared control block 403 is updated to have the new version number. At this point, the updates within the transaction are visible to all the runtime processes. REGDBSERVER in signal operation 714 also sets a REGISTRY key that runtime processes listen on, so they know it's time to flush the cache in the run-time catalog and re-get data from the latest REGDB. In addition, the old REGDB file name is added to a list to be lazily deleted by a background thread running in the System Application 402 in delete operation 715. Finally in unlock operation 716, the event object is signaled to unblock a waiting thread. During the PREPARE phase 701–702, if Save O fails, a FAIL code is returned, and DTC aborts the transaction without further notification.

REGDB transaction is completely isolated from runtime processes. And it's atomic. Using a temporary file for the updating REGDB guarantees the isolation. The worst case scenario is when the System Application 402 crashes. As a result, REGDB.tmp 423 either contains inconsistent data or becomes totally corrupted. When that happens, the transaction simply aborts. The latest snapshot of REGDB in the file system is intact. Note this approach also makes concurrent runtime readers and a single administrative writer. Without this process, file-sharing problem occurs between simultaneous readers and writers. When COMPLIB opens a file for writing, it needs an exclusive lock on the file. Most of the time, however, the latest version of the REGDB has already been opened for reading by runtime processes. This fact makes it impossible for the System Application 402 to take exclusively lock the file. By copying it to a temporary and open that one instead for writing solves the issue. The atomicity of the transaction relies on the fact that renaming a file is an atomic action if the new name is on the same drive as the old name.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for installing software components onto a computing system and registering the installed software components within a registration datastore of the computing system having a shared memory control module, a registry having a signaling key, a file system, a registration datastore compensator, a delete file list, and a shared read-only memory mapped file module, the method comprising:

obtaining a first latest version number for the registration datastore;

opening a registration data file corresponding to the registration datastore having the first latest version number;

storing the registration data file within a data table object, the data table object corresponds to a temporary version of the registration data file;

modifying the registration data file within the data table object to add registration data corresponding to the installed software components to the registration datastore;

updating the registration datastore by creating a new version registration data file having a new latest version number using a two-phase transaction process; and deleting the registration data file corresponding to the registration datastore having the first latest version number identified on the delete file list after the registration data file is no longer in use.

2. The method according to claim 1, wherein the obtaining a first latest version number for the registration datastore comprises:

obtaining the latest version number from the shared memory control block; if the latest version number obtained from the shared memory control block is not valid, obtaining the latest version number from the registry; if the latest version numbers obtained from both the shared memory control block and the registry are not valid, obtaining the latest version number from the file system.

3. The method according to claim 1, wherein the updating the registration datastore by creating a new version registration data file having a new latest version number using a two-phase transaction process comprises:

saving all updates to the registration datastore contained within the data table in a prepare phase; and updating the registration data file to create a new version registration data file having a new latest version number in a commit phase.

4. The method according to claim 3, wherein saving all updates to the registration datastore in the prepare phase comprises:

notifying the registration datastore compensator to initiate the prepare phase; and saving all updates to the registration datastore contained within the data table into the temporary version of the registration data file.

5. The method according to claim 3, wherein updating the registration data file to create the new version registration data file having a new latest version number comprises:

notifying the registration datastore compensator to initiate the commit phase;

renaming the temporary version of the registration data file to the new version registration data file having a new latest version number;

updating the latest version number within the shared control memory block;

setting the signaling key within the registry to signal an update to the registration datastore; and adding the a registration data file corresponding to the registration datastore having the first latest version number to the delete file list.

6. The method according to claim 1, wherein updating the registration data file to create the new version registration data file having the new latest version number comprises:

obtaining a transaction ID for the updating registration data file operation from a current context of the updating operation;

determining if a transaction is currently in progress;

if a transaction is in progress, obtain a transaction ID for the transaction in progress and perform the following:

comparing transaction ID for the updating registration data file operation from a current context of the updating operation with the transaction ID for the transaction in progress; and if the compared transactions IDs are the same, storing updates from the data table into the temporary version of the registration data file to complete the updating the registration data file to create the new version registration data file having the new latest version number;

if the compared transactions IDs are not the same, block further operations until transaction in progress has completed;

registering the registration datastore compensator to begin a transaction;

copying the registration data file corresponding to the first latest version number to the temporary registration data file and opening the temporary registration data file; and storing updates from the data table into the temporary version of the registration data file to complete the updating the registration data file to create the new version registration data file having the new latest version number.

7. The method according to claim 1, wherein the deleting the registration data file comprises:

adding the registration data file to the delete file list; and when the registration file is no longer in use by any process, deleting files contained on the delete file list.

8. The method according to claim 7, wherein the deleting files contained on the delete file list is performed by a background thread, the background tread repeatedly attempts to delete the files on the delete file list and succeeds in deleting the files once the files are no longer in use.

9. A computer-readable medium having computer-executable instructions for the method recited in claim 1.

10. A computer data signal embodied in a carrier wave readable by a computing system and encoding a computer program of instructions for executing a computer process performing the method recited in claim 1.

11. A method for installing software components onto a computing system and registering the installed software components within a registration datastore of the computing system having a shared memory control block, a registry having a signaling key, a file system, a registration datastore compensator, a delete file list, and a shared read-only memory mapped file module, the method comprising:

obtaining the latest version number from the shared memory control block;

if the latest version number obtained from the shared memory control block is not valid, obtaining the latest version number from the registry;

if the latest version numbers obtained from both the shared memory control block and the registry are not valid, obtaining the latest version number from the file system;

opening a registration data file corresponding to the registration datastore having the first latest version number;

storing the registration data file within a data table, the data table corresponds to a temporary version of the registration data file;

modifying the registration data file within the data table to add registration data corresponding to the installed software components to the registration datastore;

notifying the registration datastore compensator to initiate the prepare phase;

saving all updates to the registration datastore contained within the data table into the temporary version of the registration data file; notifying the registration datastore compensator to initiate the commit phase;

renaming the temporary version of the registration data file to the new version registration data file having a new latest version number;

updating the latest version number within the shared control memory block;

setting the signaling key within the registry to signal an update to the registration datastore;

adding the a registration data file corresponding to the registration datastore having the first latest version number to the delete file list; and deleting the registration data file corresponding to the registration datastore having the first latest version number identified on the delete file list after the registration data file is no longer in use.

12. A computer-readable medium having computer-executable instructions for the method recited in claim 11.

13. A computer data signal embodied in a carrier wave readable by a computing system and encoding a computer program of instructions for executing a computer process performing the method recited in claim 11.

14. A system for installing software components onto a computing system and registering the installed software components within a registration datastore of the computing system having, the system comprising:

a shared memory control block for maintaining a latest version number for the registration database;

a system application module for updating the registration datastore;

a real-time catalog module for providing software component registration data to installed software components during their run-time execution; and a file system module having a plurality of data files for storing the registration datastore;

wherein the system application module updates the registration datastore by:

copying the registration datastore into a temporary version of the datastore;

storing the updates to the registration datastore into the temporary version of the datastore; and when all updates are successfully included within the temporary version of the datastore, renaming the temporary version of the datastore to the registration datastore, updating the version number for the current version of the registration datastore, and signaling the update to the registration datastore using a signaling key in a system registry.

15. The system according to claim 14, wherein the system application module comprises:

a registration datastore compensator module performing all transaction related operations during the updating of the registration datastore;

a background thread modules for deleting versions of the registration datastore no longer in use;

a read/write data table for storing updates to the registration datastore temporarily during the installation and registering of the software components;

a relational database engine module for saving the updates to the registration datastore from the read/write data table to the temporary version of the registration datastore; and a registration database server module for maintaining the version number for the registration datastore within the shared memory control block.

* * * * *